United States Patent
Yoshimura et al.

(10) Patent No.: US 7,348,286 B2
(45) Date of Patent: *Mar. 25, 2008

(54) CERAMIC COMPOSITE MATERIAL AND METHOD OF ITS MANUFACTURE

(75) Inventors: Masashi Yoshimura, Itami (JP); Tomoyuki Ueno, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/904,191

(22) Filed: Oct. 28, 2004

(65) Prior Publication Data

US 2005/0101472 A1    May 12, 2005

(30) Foreign Application Priority Data

Oct. 29, 2003   (JP)   ............... 2003-368716

(51) Int. Cl.
*C04B 35/52*   (2006.01)
*B28B 7/34*    (2006.01)

(52) U.S. Cl. .................. 501/99; 501/100; 501/90; 501/96.1; 106/38.28; 106/38.9

(58) Field of Classification Search ......... 501/96.4, 501/99, 100, 101, 90, 96.1; 977/778, 963; 106/38.28, 38.9
See application file for complete search history.

(56) References Cited

U.S. PATENT DOCUMENTS

| | | | |
|---|---|---|---|
| 4,968,647 A * | 11/1990 | Ownby .................. | 501/99 |
| 5,466,431 A * | 11/1995 | Dorfman et al. ......... | 423/446 |
| 5,690,706 A | 11/1997 | Sigalas et al. | |
| 5,728,637 A * | 3/1998 | Mishra et al. .......... | 501/127 |
| H001924 H * | 12/2000 | Zabinski et al. ........ | 204/192.16 |
| 6,420,293 B1 * | 7/2002 | Chang et al. ........... | 501/95.2 |
| 6,461,990 B1 * | 10/2002 | Masuda et al. .......... | 501/96.4 |
| 6,759,128 B1 * | 7/2004 | Zhao et al. ............ | 428/408 |
| 6,821,919 B2 * | 11/2004 | Hon et al. ............. | 501/96.1 |
| 6,844,282 B2 * | 1/2005 | Yoshimura .............. | 501/97.4 |

FOREIGN PATENT DOCUMENTS

| | | |
|---|---|---|
| DE | 198-45-151 A1 | 4/2000 |
| EP | 0-715-930 A1 | 6/1996 |
| EP | 1-298-106 A1 | 4/2003 |
| JP | S52-064267 A | 5/1977 |
| JP | S60-060965 A | 4/1985 |
| JP | S60-100646 A | 6/1985 |
| JP | H05-024864 A | 2/1993 |
| JP | H05-270844 | 10/1993 |
| JP | H05-301773 A | 11/1993 |
| JP | H09-087029 A | 3/1997 |
| JP | H10-231174 A | 9/1998 |
| JP | P2000-203851 A | 7/2000 |
| JP | 2001019411 * | 1/2001 |
| JP | 2001-100016 A | 4/2001 |
| JP | 2004-339048 A | 12/2002 |
| JP | 2003-034577 A | 2/2003 |
| JP | 2003-034580 A | 2/2003 |
| JP | 2003-034584 A | 2/2003 |
| JP | 2003-063832 A | 3/2003 |
| JP | 2004-067432 A | 3/2004 |

OTHER PUBLICATIONS

M. Yoshimura, et al., "Development of Non-Oxide-Based Nano-Structured Ceramics," SEI Technical Review, vol. 164, Mar. 2004, pp. 24-29, XP009041290.

* cited by examiner

*Primary Examiner*—Karl E Group
(74) *Attorney, Agent, or Firm*—James Judge

(57) ABSTRACT

Ceramic composite material that has excellent mechanical properties within a range from room temperature to high temperature and high die release with respect to glass, resins, ceramics, and similar substances. The ceramic composite material is composed of a ceramic phase and a phase containing 2 to 98 wt. % carbon and/or boron nitride as the main component, and that has a mean particle size of 100 nm or less, wherein the thermal expansion coefficient is within a range of $2.0\text{-}9.0 \times 10^{-6}/°$ C. and the surface roughness after surface polishing is 0.05 μm or less. The sintered body of the material is obtained by sintering a mixture of powdered starting materials at a sintering temperature of 800-1500° C. and a sintering pressure of 200 MPa or higher.

6 Claims, No Drawings

CERAMIC COMPOSITE MATERIAL AND METHOD OF ITS MANUFACTURE

BACKGROUND OF THE INVENTION

1. Field of the Invention

The present invention relates to ceramic composite materials employed as die materials for the transfer molding of glass, resins, ceramics, and similar substances. In particular the present invention relates to such ceramic composites having excellent mechanical and thermal properties.

2. Description of the Background Art

In matched die molding as the basis of forming operations, improving the die release between the dies and the material that is being molded by them has always been crucial.

For example, Japanese Unexamined Pat. App. Pub. No. 2001-100016 discloses a means for separating mold components and the molded material by exploiting the difference in their respective thermal expansion coefficients. However, the die materials selected for this method are conventional, well-known materials, most of which have low heat resistance, which has led to problems in practical use.

Japanese Unexamined Pat. App. Pub. No. 2003-63832 discloses a die material designed so that the linear thermal expansion coefficient of the die material is lower than the linear thermal expansion coefficient of the molded material. The die material in this case is a glass material, which places a limitation on the temperature range or pressure at which the die material can be used, thus presenting problems in practical use. A further problem is that determining the thermal expansion coefficient of the die material according to the form of the glass, resin, or ceramic material that is actually to be molded is critical, which has led to demands for die materials that allow the thermal expansion coefficient to be controlled.

Methods based on compositing are effective as means for controlling the thermal expansion coefficient.

For example, Japanese Unexamined Pat. App. Pub. No. 2003-34580 discloses a material with excellent friction properties and wear resistance, composed of a composite material of silicon nitride, titanium nitride, and 0.5 to 20 wt. % graphite and carbon. However, from an attempt to sinter the powder under the conditions described in this patent publication it was evident that the product could not be used for dies because the filling density was a low 93%, numerous pores with a diameter of 20 µm or more were discerned in observations made using SEM at a magnification of 2000×, and density was insufficient.

Another compositing example, reported in Japanese Unexamined Pat. App. Pub. No. S60-100646, is a highly tough material in which C, Cr, Mo, W, Al, Ti, and Ni are incorporated at 0.5 to 6 wt. % as an oxidation-resistant alloy into an alumina and zirconia powder. However, the carbon content is a slight 0.1 to 0.2 wt. %, and thus the material lacks the lubricity required of a die.

In turn, Japanese Unexamined Pat. App. Pub. No. H09-87029 reports that a material obtained by adding 2 to 50 wt. % carbon with a particle size of 5 µm or more to silicon carbide has excellent wear resistance, and reported in Japanese Unexamined Pat. App. Pub. No. H05-301773 is a material in which 3 to 30 wt. % graphite with a mean particle size of 3 to 6 µm is dispersed in a titanium carbide matrix. However, these materials have a large mean particle diameter of carbon of 3 µm or more, and in machining the materials into desired form, the surface roughness is affected by the particle diameter, which is prohibitive of producing mirrorlike surfaces—a surface roughness (Ra) of 50 nm or less—on the formed materials.

Japanese Unexamined Pat. App. Pub. No. H10-231174 describes a material in which graphite and boron nitride are dispersed in a non-oxide ceramic, and iron oxide, iron silicide, or a similar iron compound is interposed at the boundary layer. However, this material is not suitable for dies because of oxidation-induced deterioration owing to the inclusion of iron and because of the lack of stability at high temperatures.

SUMMARY OF THE INVENTION

With the circumstances discussed above in view, the present invention affords a ceramic composite material having excellent mechanical properties in a temperature range from room temperature to high temperatures, and in addition enabling free control of the thermal expansion coefficient and having heightened die release (how well a material being molded parts from molding die made of the composite material) with respect to glass, resins, and ceramics. The present invention also makes available a method for the manufacture of such a ceramic composite material.

Based on the results of intensive study, the inventors discovered that the above-described problems can be resolved with a ceramic composite material composed of a ceramic phase and a phase containing carbon and/or boron nitride as the main component, and having a mean crystal grain size of 100 nm or less and a thermal expansion coefficient within a range of 2.0 to $9.0 \times 10^{-6}/°$ C. This finding led to the creation of the present invention, which has the following features:

(1) A ceramic composite material that is composed of a phase containing carbon and/or boron nitride as the main component and a ceramic phase, and that has a mean crystal grain size of 100 nm or less, wherein the thermal expansion coefficient is within a range of 2.0 to $9.0 \times 10^{-6}/°$ C.

(2) The ceramic composite material according to the above-described clause (1), wherein the content of carbon and/or boron nitride is 2 to 98 wt. %.

(3) The ceramic composite material according to the above-described clauses (1) and (2), wherein the ceramic phase is composed of at least one compound selected from nitrides, carbides, and oxides of Al, Si, Ti, Zr, Hf, V, Nb, Ta, Cr, Mo, and W, and composite compounds thereof.

(4) The ceramic composite material according to the above-described clauses (1) to (3), wherein the surface roughness (Ra) after surface polishing is 0.05 µm or less.

(5) A method for the manufacture of a ceramic composite material with a mean crystal grain size of 100 nm or less and a thermal expansion coefficient within a range of 2.0 to $9.0 \times 10^{-6}/°$ C., comprising: molding a powder with a mean particle size of 100 nm or less that is a mixture of a ceramic powder, and a carbon powder and/or boron nitride powder; and sintering the obtained molded object in a non-oxidizing atmosphere at a sintering temperature of 800 to 1500° C. and a sintering pressure of 200 MPa or higher.

(6) The method for the manufacture of a ceramic composite material according to the above-described clause (5), wherein the ceramic powder is at least one compound selected from nitrides, carbides, and oxides of Al, Si, Ti, Zr, Hf, V, Nb, Ta, Cr, Mo, and W.

(7) The method for the manufacture of a ceramic composite material according to clause (5) or (6), wherein the mixed powder further comprises at least one metal selected from Al, Si, Ti, Zr, Hf, V, Nb, Ta, Cr, Mo, and W.

A ceramic composite material in accordance with the present invention has excellent mechanical properties and also has enhanced die release with respect to glass, resins, and ceramics.

From the following detailed description in conjunction with the accompanying drawings, the foregoing and other objects, features, aspects and advantages of the present invention will become readily apparent to those skilled in the art.

DETAILED DESCRIPTION OF THE INVENTION

The present invention provides a ceramic composite material including ceramic powder having a mean particle size of 100 nm or less and including a phase containing carbon and/or boron nitride as the main component, wherein the thermal expansion coefficient is within a range of 2.0 to $9.0 \times 10^{-6}/°$ C. Another feature of the material in accordance with the present invention is that the thermal expansion coefficient can be freely controlled within a range of 2.0 to $9.0 \times 10^{-6}/°$ C.

The present material must be constituted of ceramic particles with a mean particle size of 100 nm or less. It is undesirable that the mean particle size exceed 100 nm, because in this case, microcracks induced by the difference in thermal expansion occur inside the ceramic composite material, causing degradation of mechanical properties and fracture of the die material during molding. In accordance with the present invention, the mean particle size is preferably 50 nm or less, more preferably 10 nm or less.

Further, in order to increase die release with respect to glass, resins, and ceramics, the ceramic composite material of the present invention must include a phase containing carbon and/or boron nitride as the main component. Those materials have low reactivity with glass, metals, and ceramics, thus improving die release. The main components to be selected in this case can be appropriately selected according to the material to be molded.

A specific feature of the materials thus selected is that the thermal expansion coefficient thereof can be freely controlled within a range of 2.0 to $9.0 \times 10^{-6}/°$ C. Such control of the thermal expansion coefficient makes it possible to further improve die release by exploiting the difference in thermal expansion coefficient between the dies and the material that is being molded by the dies, this difference manifesting itself in the cooling process after molding at a predetermined temperature in a high-temperature range. Apart from this possibility, providing identical thermal expansion coefficients, it is also possible to conduct mold transfer of complex shapes. A material with an appropriate thermal expansion coefficient can be used by freely designing the composition and mixing ratio of the components thereof according to the material to be molded, the shape, and other considerations.

It is preferred that the content of carbon and/or boron nitride be 2 to 98 wt. %. It is undesirable that the content be less than 2 wt. % because the die release is compromised, and it is also undesirable that the content be more than 98% because the mechanical properties suffer. Further, it is especially preferred that the content of carbon and/or boron nitride be 40 to 80 wt. %, because die release with respect to glass, resins, and ceramics is further enhanced.

The carbon and boron nitride of the present invention may be any substance for which the constituent substances are carbon and boron nitride. For example, carbon may be selected as appropriate from among substances such as graphite, glassy carbon, acetylene black, diamond, carbon nanotubes, and fullerenes. Similarly, various types of boron nitride may be selected.

Further, in the ceramic composite material in accordance with the present invention, the substance to serve as a ceramic phase is selected such that the linear thermal expansion coefficient of the material can be controlled within a range of 2.0 to $9.0 \times 10^{-6}/°$ C. When carbon is selected as a component contributing to die release, the ceramic phase constituting the material in accordance with the present invention is a phase other than carbon; when boron nitride is selected as a component contributing to die release, the ceramic phase is a ceramic other than boron nitride. Further, the ceramic composite material in accordance with the present invention may comprise both the carbon and the boron nitride.

It is desirable that the ceramic phase constituting the ceramic composite material in accordance with the present invention comprise at least one compound selected from nitrides, carbides, and oxides of Al, Si, Ti, Zr, Hf, V, Nb, Ta, Cr, Mo, and W. Further, the ceramic phase may be a composite nitride, composite carbide, or composite oxide of the aforementioned metals, which are composite compounds of the aforementioned nitrides, carbides, and oxides, or it may be a carbonitride, oxynitride, carbooxynitride, or carbonate of the aforementioned metals. One or more types of the ceramic-phase materials can be selected appropriately according to the type of material to be molded and to what value it is desired to control the linear thermal expansion coefficient.

The ceramic composite material in accordance with the present invention is obtained by molding a mixed powder having a mean particle size of 100 nm or less and composed of a ceramic powder of at least one type selected from nitrides, carbides, and oxides of Al, Si, Ti, Zr, Hf, V, Nb, Ta, Cr, Mo, and W and a carbon powder and/or boron nitride powder, and sintering the obtained molded object in a non-oxidizing atmosphere at a sintering temperature of 800 to 1500° C. and a sintering pressure of 200 MPa or higher. The non-oxidizing atmosphere can be selected from a vacuum atmosphere or an inactive gas atmosphere such as $H_2$, $N_2$, or Ar. Further, the aforementioned mixed powder may further comprise at least one metal selected from among Al, Si, Ti, Zr, Hf, V, Nb, Ta, Cr, Mo, and W. These metals react with carbon present in the mixed powder to form carbides or, when the non-oxidizing atmosphere is $N_2$, they react with $N_2$ to form nitrides. In accordance with needs, a publicly-known sintering promoter may be used to improve sinterability, but making the additive amount of sintering promoter, which is oxide-based, large disadvantageous because doing so intensifies the reaction of the molded object with carbon, which is prohibitive of manufacturing a densified material and compromises the material's mechanical properties.

Combining nanosize powders and sintering is an example of a method for the manufacture of the present material. Powders for sintering may be prepared by mixing and grinding the powders to a nanosize mean particle size. Alternatively, powders obtained by a vapor-phase method, powders obtained by thermal decomposition of organic polymer materials comprising inorganic elements, or commercial powders of an nm size may be used. It is important that the powders be thoroughly and uniformly ground and mixed in the manufacture of the composite material; grinding and mixing can be conducted in a vibration ball mill, planetary ball mill, or the like.

The powder mixture thus obtained is solidified in a nonoxidizing atmosphere at a sintering temperature of 800 to 1500° C. and a sintering pressure of 200 MPa or more. It is desirable that the ceramic composite material thus obtained have a post-polishing surface roughness of 0.05 μm or less.

A sintering temperature of less than 800° C. will not promote sintering and hardening, leaving the material with a surface roughness (Ra) of 0.05 μm or more even after considerable polishing, so that it is inadequate for use as a die material. Further, when the sintering temperature is above 1500° C., grain growth is promoted, thus making it difficult to control grain size to 100 nm or less, compromising the above-described mechanical properties. Therefore, it is especially preferred that the sintering temperature be in a range of 1000 to 1400° C. Also, it is undesirable that the sintering pressure be less than 200 MPa, because this causes the surface roughness (Ra) to exceed 0.05 μm. The sintering pressure must be 200 MPa or higher, preferably 1000 MPa or higher, in order to obtain surface roughness (Ra) of 0.05 μm or less.

The present invention will be described below in greater detail based on embodiments thereof.

The following measurement methods were used in the embodiments.

(1) Measurement of Mean Particle Size of Powders

The measurements were conducted by using a TEM (transmission electron microscope: H-9000 UHRIII, manufactured by Hitachi Ltd.).

A total of 100 particles of the powder were randomly sampled from an arbitrary area of the image obtained with the TEM, the particle diameter was measured, and the average value of measurement results was considered as a mean particle diameter.

(2) Measurement of Mean Crystal Grain Size

The measurements were conducted by using a TEM (transmission electron microscope: H-9000 UHRIII, manufactured by Hitachi Ltd.).

A straight line was drawn through 50 particles in a random location of the image obtained with the TEM and a particle diameter was found by dividing the length of the line by the number of particles. This operation was conducted for five randomly selected locations and the average value of measurement results was considered as a mean crystal grain size.

(3) Measurement of Surface Roughness

The measurements were conducted by using a three-dimensional surface structure analyzer (New View 5000, manufactured by ZYGO Co).

EMBODIMENT 1

A TiN powder (particle size 0.3 μm), 30 wt. %, VN (particle size 0.3 μm), 30 wt. %, and C (graphite powder, particle size 5 μm), 40 wt. %, were ground and mixed 6 h, 12 h, and 24 h using a planetary ball mill with a 100-g acceleration, and respective mixed powders with a mean particle size of 65 nm, 34 nm, and 5 nm were obtained.

Ceramic composite materials were obtained by sintering the obtained mixed powders under vacuum at 1200° C. and 1000 MPa. The mean crystals grain size in the samples of the obtained ceramic composite materials was measured with a TEM.

Test samples (6×6×1 mm) were prepared from the sample materials obtained and the values of linear thermal expansion coefficients within a range of 25° C. to 600° C. were measured by using a laser thermal expansion meter (LIX-1, manufactured by Arubakku Riko K. K.).

The obtained sample materials were machined to a concave lens shape with a diameter of 10 mm, molding (number of molding cycles n=100) was conducted at a temperature of 740° C. and under a pressure of 50 MPa by using Pyrex™ glass, and moldability and die release were evaluated. As a comparative example, the powders of Embodiment 1 were mixed at an acceleration of 2 G in a dry ball mill and were sintered and evaluated by the same method as described above. Further, moldability and die release were similarly evaluated by using GC (glassy carbon), which is often used as a die material.

The mean crystal grain size of the produced materials was measured with a TEM. The resulting measurement was 80 nm for the 6 h mixture, 40 nm for the 12 h mixture, and 10 nm for the 24 h mixture. The thermal expansion coefficient was $5.0 \times 10^{-6}$. The surface roughness (Ra) was 0.03, 0.02, and 0.01 μm, respectively. The mean crystal grain size of the comparative sample material was 300 nm.

The results of a molding test demonstrated that molding was possible with all the materials. However, with the 300 nm material of the comparative sample material, fissures appeared in the convex lens surface at n=5. Furthermore, with the GC, fissures appeared at n=50.

EMBODIMENT 2

Powders in the compositions shown in Table I were mixed 12 h, using the same apparatus as was used in Embodiment 1; mixed powders with mean particle sizes shown in Table I were obtained, and sample materials were produced in the same manner as in Embodiment 1. Mean crystal grain size and thermal expansion coefficients of the produced sample materials were measured in the same manner as in Embodiment 1, and a molding test was conducted by using the shapes and molded materials shown in Table II. The particle size of all the obtained materials was 100 nm or less.

TABLE I

| Example No. | TiN | VN | C | Tm ($\times 10^{-6}$) | Particle size (nm) | Particle size of starting powders for mixing (nm) |
|---|---|---|---|---|---|---|
| 2-1 | 1 | 1 | 98 | 2.1 | 30 | 10 |
| 2-2 | 10 | 10 | 80 | 3.5 | 15 | 8 |
| 2-3 | 20 | 20 | 60 | 4.0 | 8 | 3 |
| 2-4 | 60 | 38 | 2 | 8.3 | 80 | 60 |
| Comp. Ex. A | 0.5 | 0.5 | 99 | 1.9 | 30 | 15 |
| Comp. Ex. B | 85 | 14 | 1 | 9.1 | 150 | 90 |

TABLE II

| Example No. | Molded material | Temperature (° C.) | Shape |
|---|---|---|---|
| 2-1 | Quartz | 1400 | Comb-tooth shape |
| 2-2 | BK7 | 680 | Concave lens shape |
| 2-3 | BK7 | 680 | Concave lens shape |
| 2-4 | ZrO$_2$ | 1200 | Convex lens shape |
| Comp. Ex. A | Quartz | 1400 | Comb-tooth shape |
| Comp. Ex. B | ZrO$_2$ | 1200 | Convex lens shape |

BK7: borosilicate crown glass
Comb-tooth shape: width 5 μm × height 1 μm × 10 columns
Both the concave lens and the convex lens have a diameter of 10 mm.

In all cases, good results were obtained by controlling the thermal expansion coefficient of the present material to a desired value. The die material of comparative example A fractured during the molding test, and in comparative example B, the molded material adhered strongly to the mold during the molding test and was difficult to release.

With methods other than the powder mixing method of the present embodiment, such as a vapor phase method or a preparation method comprising using and mixing nanosize commercial powders, the mean crystal grain size was also 100 nm or less and similar results were obtained.

EMBODIMENT 3

Mixed powders with a mean particle size of about 50 nm were obtained and sample materials were prepared in the same manner as in Embodiment 1 by using the compositions shown in Table III. The molding test was conducted with respect to the obtained sample materials by using the molded materials shown in Table III in the same manner as in Embodiment 1. The mean crystal grain size of all the obtained materials was 100 nm or less.

Further, in Examples 3-9, Ti was added as a metal, but it was converted into TiCN by a mechanochemical reaction after mixing.

TABLE III

| Ex. No. | Composition 1 Material | wt. % | Composition 1 Material | wt. % | Composition 1 Material | wt. % | Tm ($\times 10^{-6}$) | Molded material | Molding temp. (° C.) |
|---|---|---|---|---|---|---|---|---|---|
| 3-1 | $Si_3N_4$ | 50 | — | — | BN | 50 | 2.1 | ZnS | 1050 |
| 3-2 | SiAlON | 30 | TiCN | 40 | C | 30 | 3.6 | Pyrex | 760 |
| 3-3 | SiC | 50 | ZrN | 30 | BN | 20 | 3.2 | BK7 | 700 |
| 3-4 | HfN | 10 | NbN | 60 | C | 30 | 5.1 | Pyrex | 750 |
| 3-5 | AlN | 50 | — | — | BN | 50 | 2.2 | Cu | 200 |
| 3-6 | WC | 10 | NbN | 80 | C | 10 | 8.5 | Resin | 200 |
| 3-7 | $ZrO_2$ | 10 | SiC | 10 | C | 80 | 2.3 | Resin | 200 |
| 3-8 | $B_4C$ | 20 | CrN | 10 | BN | 70 | 2.25 | Resin | 200 |
| 3-9 | SiC | 40 | Ti | 30 | C | 30 | 3.3 | Pyrex | 710 |

The results of the molding test demonstrated good moldability and die release in all cases. Furthermore, the materials obtained in the present embodiment are not limited to molded materials shown in the examples but can be employed with molding-subject materials being various types of ceramics, glass, metals, and resins. Molding-subject materials of various compositions and thermal expansion coefficients can be selected according, for example, to the shape which is to be molded or to companion molding materials in combination.

EMBODIMENT 4

Materials were prepared under vacuum at the temperatures and pressures shown in Table IV, using the mixed powders employed in Embodiment 1. Surface roughness was measured after polishing the prapared materials to a mirrorlike finish.

TABLE IV

| Example No. | Temp. (° C.) | Press. (MPa) | Surface roughness (μm) |
|---|---|---|---|
| Comparative Example C | 500 | 1000 | 0.3 |
| 4-1 | 800 | 2000 | 0.03 |
| 4-2 | 1000 | 1500 | 0.015 |
| 4-3 | 1400 | 200 | 0.04 |
| Comparative Example D | 1500 | 100 | 0.2 |
| Comparative Example E | 1600 | 1000 | 0.01 |

The results shown above demonstrate that the surface roughness (Ra) is 0.05 μm or more when the sintering temperature is low and when the pressure is low. Further, the material of Example No. 4-3 was not suitable for practical use because the particle size was 100 nm or more and the die material fractured in the molding test. These results exhibit similarities to the results applying to the materials of Embodiment 3.

The ceramic composite material in accordance with the present invention has excellent wear resistance, low friction ability, and high die release with respect to glass, resins, ceramics, and similar substances. Therefore, it is suitable for cutting tools, sliding parts, and die materials.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. A ceramic composite material comprising:
    40-98 wt % of a phase whose main component is carbon, said carbon selected from the group consisting of graphite, glassy carbon, acetylene black, and diamond; and
    a ceramic phase having a mean crystal grain size of 100 nm or less; wherein
    the ceramic composite material having a thermal expansion coefficient that is within a range of 2.0 to 9.0 $\times 10^{-6}$/° C.; and
    said ceramic phase is composed of at least one compound selected from nitrides, carbides, and oxides of Si, Hf, V, Nb, Ta, Cr, Mo, and W, and composite compounds of said nitrides, carbides, and oxides.
2. A ceramic composite material as set forth in claim 1, wherein the surface roughness Ra after the surface of the composite material is polished is 0.05 μm or less.

3. A ceramic composite material comprising:
40-98 wt % of a phase whose main component is carbon, said carbon selected from the group consisting of graphite, glassy carbon, acetylene black, and diamond; and
a ceramic phase having a mean crystal grain size of 100 nm or less; wherein
the ceramic composite material having a thermal expansion coefficient that is within a range of 2.0 to 9.0× $10^{-6}/°$ C.; and
said ceramic phase is composed of at least one compound selected from nitrides and carbides of Si, Hf, V, Nb, Ta, Cr, Mo, and W, and composite compounds of said nitrides and carbides.

4. A ceramic composite material comprising:
40-98 wt % of a phase whose main component is carbon, said carbon selected from the group consisting of graphite, glassy carbon, and acetylene black; and
a ceramic phase having a mean crystal grain size of 100 nm or less; wherein
the ceramic composite material having a thermal expansion coefficient that is within a range of 2.0 to 9.0× $10^{-6}/°$ C.; and
said ceramic phase is composed of at least one compound selected from nitrides and carbides of Si, Hf, V, Nb, Ta, Cr, Mo, and W, and composite compounds of said nitrides and carbides.

5. A ceramic composite material as set forth in claim 3, wherein the surface roughness Ra after the surface of the composite material is polished is 0.05 μm or less.

6. A ceramic composite material as set forth in claim 4, wherein the surface roughness Ra after the surface of the composite material is polished is 0.05 μm or less.

* * * * *